United States Patent
Hong et al.

(10) Patent No.: US 9,124,590 B2
(45) Date of Patent: Sep. 1, 2015

(54) INTELLIGENT INFORMATION PROVIDING SYSTEM AND METHOD

(75) Inventors: Sang Woo Hong, Seoul (KR); Sang Hee Shin, Seoul (KR); Yoon Kyung Kim, Seongnam-si (KR); Bo Mi Kim, Seongnam-si (KR); Jae Eun Suh, Seoul (KR); Song Yi Yang, Seoul (KR)

(73) Assignee: SK PLANET CO., LTD., Seongnam-Si (KR)

( * ) Notice: Subject to any disclaimer, the term of this patent is extended or adjusted under 35 U.S.C. 154(b) by 0 days.

(21) Appl. No.: 14/232,111

(22) PCT Filed: Apr. 27, 2012

(86) PCT No.: PCT/KR2012/003317
§ 371 (c)(1),
(2), (4) Date: Jan. 10, 2014

(87) PCT Pub. No.: WO2013/012159
PCT Pub. Date: Jan. 24, 2013

(65) Prior Publication Data
US 2014/0156796 A1  Jun. 5, 2014

(30) Foreign Application Priority Data

Jul. 19, 2011  (KR) .................. 10-2011-0071507
Aug. 25, 2011  (KR) .................. 10-2011-0085051
Dec. 5, 2011  (KR) .................. 10-2011-0128872

(51) Int. Cl.
*H04L 29/08* (2006.01)
*G06F 17/30* (2006.01)

(52) U.S. Cl.
CPC .......... *H04L 67/10* (2013.01); *G06F 17/30528* (2013.01)

(58) Field of Classification Search
CPC ...................................................... H04L 67/10
USPC ........................... 709/217; 715/256, 741, 823
See application file for complete search history.

(56) References Cited

U.S. PATENT DOCUMENTS

2003/0101177 A1* 5/2003 Matsubayashi et al. .......... 707/6
2005/0283726 A1* 12/2005 Lunati .......................... 715/533

(Continued)

FOREIGN PATENT DOCUMENTS

KR  10-2007-0104782 A  10/2007
KR  10-2008-0043140 A  5/2008

(Continued)

OTHER PUBLICATIONS

"Autocomplete"—Wikipedia, Apr. 2010 http://en.wikipedia.org/wiki/Autocomplete.*

*Primary Examiner* — Randy Scott
(74) *Attorney, Agent, or Firm* — Lowe Hauptman & Ham, LLP

(57) ABSTRACT

Disclosed is an intelligent information providing system including: a user terminal requesting a registration of an intent for a word selected from a content recorded on a memo pad and receiving information related to the registered intent or style information on a role model in a group related to the intent; and an information management device registering the intent requested by the user terminal and providing the information related to the registered intent or the style information on the role model in the group related to the intent to the user terminal.

22 Claims, 8 Drawing Sheets

(56) References Cited

U.S. PATENT DOCUMENTS

2008/0204282 A1\* 8/2008 Jeon ............................... 341/22
2010/0312767 A1\* 12/2010 Saito ............................ 707/739

FOREIGN PATENT DOCUMENTS

| KR | 10-2008-0092746 A | 10/2008 |
| KR | 10-2010-0032071 A | 3/2010 |

\* cited by examiner

FIG.8a

| thumbnail | product image, product name, price, place by price, product review<br>Ex)edible oil(intent)-->Haepyo canola oil1.8L/16,800won/E-mart<br>     product review existence<br>     grape seed oil500ml/6800won/Lotte mart/product<br>review non-existence |
|---|---|
| Detail Page | product image, product name, price, place by price, Spec(inclusive of option), delivery charge, product review(Blog-displayed in the case of existence) |

FIG.8b

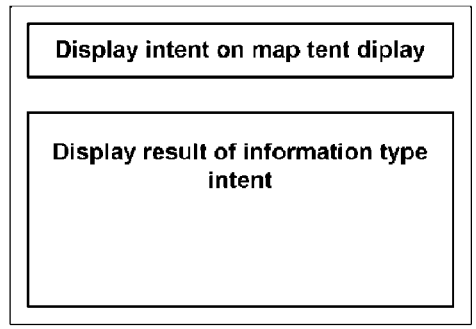

FIG.8c

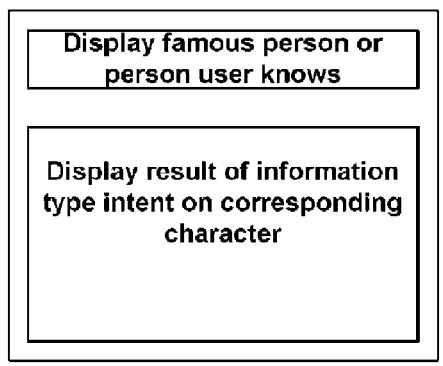

INTELLIGENT INFORMATION PROVIDING SYSTEM AND METHOD

BACKGROUND OF THE INVENTION

1. Field of the Invention

The present invention relates to an intelligent information providing system and method, and more particularly, to an intelligent information providing system and method wherein when a registration of an intent for a word selected from a content recorded on a memo pad is requested from a user terminal, the intent is registered by an information management device so that the information related to the registered intent or the style information on a role model in a group related to the intent is provided to the user terminal from the information management device.

2. Background of the Related Art

Recently, the number of information providers and consumers has been increased, and thus various media for providing information have appeared. In the sea of information, accordingly, users want to obtain personalized information in response to their intent, which definitely needs development application programs for intelligent information search.

Personalized service means service providing customized contents in accordance with the personal information of a user. For example, through the personalized service, the use form of the internet of a person is analyzed to constitute his or her initial screen with the optimized information by person, and alternatively, the styles of members are divided by content to constitute the screen in accordance with the contents used mainly by each person.

According to the conventional personalized service, the use history of the user is collected and patterned, and the intent of the user is learned in accordance with the use patterns, thereby expecting the potential intent of the user.

However, the conventional personalized service needs a lot of time for collecting and analyzing the use history of the user and further fails to rightly expect the intent of the user.

Besides, information is provided to the user, irrespective of the user intent, and therefore, the user inconveniently requests the information in response to the intent of the user again.

Further, only the information requested by the user is provided to the user, thereby failing to obtain the style information on other users having similar styles to the user, which has a difficult in establishing his or her own style.

SUMMARY OF THE INVENTION

Accordingly, the present invention has been made in view of the above-mentioned problems occurring in the prior art, and it is an object of the present invention to provide an intelligent information providing system and method that select a word to be registered as an intent from a content recorded on a memo pad and registers the selected word as the intent.

It is another object of the present invention to provide an intelligent information providing system and method wherein when a given word is selected from a memo content recorded on a memo pad, the selected word is enlarged and outputted and registered as an intent and alternatively an intent recommendation list for the selected word is displayed and the word selected by the user is registered as the intent, in accordance with a previously set designation type.

It is yet another object of the present invention to provide an intelligent information providing system and method that analyze an intent registered to recognize the intent of a user and provides the information related to the intent in the form of optimal templates in response to the intent of the user.

It is still another object of the present invention to provide an intelligent information providing system and method that perform the grouping for users having similar styles to each other with respect to the content of a registered intent, apply names to the respective groups, and provide the style information on other users contained in the same group as a user to allow the user to establish his or her own style.

To accomplish the above-mentioned objects of the present invention, according to a first aspect of the present invention, there is provided an intelligent information providing system including: a user terminal requesting a registration of an intent for a given word selected from a content recorded on a memo pad and receiving information related to the registered intent or style information on a role model in a group related to the intent; and an information management device registering the intent requested by the user terminal and providing the information related to the registered intent or the style information on the role model in the group related to the intent to the user terminal.

According to the embodiment of the present invention, when the given word is selected from the content recorded on the memo pad, the user terminal enlarges and outputs the selected word and registers the enlarged word as the intent and alternatively outputs an intent recommendation list for the selected word and registers the word selected in the intent recommendation list by a user as the intent, in accordance with a previously set intent designation type.

According to the embodiment of the present invention, the information management device analyzes the registered intent to recognize the intent of the user, searches for an information map database to extract the information related to the intent, converts the extracted information related to the intent into a template in response to the recognized intent of the user, and provides the template to the user terminal.

According to the embodiment of the present invention, the information management device performs grouping for users having similar styles to each other with respect to the content of the registered intent, applies names to the respective groups, selects a role model by group, and provides the style information on the role model to the user terminal.

To accomplish the above-mentioned objects of the present invention, according to a second aspect of the present invention, there is provided a user terminal including: a communication unit communicating with an information management device; an intent management unit enlarging and outputting a given word when the given word is selected from a content recorded on a memo pad by a user and registering the enlarged word as an intent and alternatively outputting an intent recommendation list for the selected word and registering the word selected in the intent recommendation list by the user as an intent, in accordance with a previously set intent designation type; an intent display unit displaying the information related to the intent or the style information on a role model provided from the information management device through the communication unit; and a control unit controlling the operations of the units so that a final intent list obtained through the registration or deletion of the intent is periodically transmitted to the information management device through the communication unit, and new information related to the intent contained in the final intent list or the style information on the role model is periodically received from the information management device and displayed through the intent display unit.

According to the embodiment of the present invention, the user terminal further includes an information reception notification unit notifying the user of the reception of new intent-related information when the new information related to the intent contained in the final intent list or the style information on the role model in the group related to the intent is received through the first communicating unit.

According to the embodiment of the present invention, when the intent designation type is a recommendation input type, the intent management unit recognizes the selected word to acquire similar words thereto, outputs the similar words as the intent recommendation list, and designates the word selected by the user in the intent recommendation list as the intent.

According to the embodiment of the present invention, when the intent designation type is an enlargement input type, the intent management unit enlarges and outputs all of the words on a line in which the selected word is contained and designates the word selected by the user in the enlarged and outputted words as the intent.

According to the embodiment of the present invention, the information related to the intent may be formed of the information converted into templates in response to the intent of the user.

To accomplish the above-mentioned objects of the present invention, according to a third aspect of the present invention, there is provided an information management device including: a communication unit communicating with a user terminal; an intent management unit registering an intent when a registration of the intent is requested from the user terminal through the communication unit; and an information providing unit providing information related to the registered intent or style information on a role model in a group related to the intent to the user terminal.

According to the embodiment of the present invention, the information management device further includes an information map database storing the relation between concepts by category and the information corresponding to each concept in the form of a tree, and the information providing unit recognizes the intent of the user in response to categories where the information related to the intent is present, searches for the information map database to extract the information related to the intent, converts the extracted information related to the intent into templates in response to the recognized intent of the user, and provides the templates to the user terminal through the communication unit.

According to the embodiment of the present invention, the information providing unit searches for the information map database to determine the categories where the information related to the intent is present and recognizes at least one user intent among information type intent, schedule type intent, location type intent, character type intent, and planning type intent in accordance with the determined categories.

According to the embodiment of the present invention, the templates have different structures in accordance with the information type intent, schedule type intent, location type intent, character type intent, and planning type intent, and each template is divided into before and after a target action is achieved.

According to the embodiment of the present invention, the information providing unit compares the information map database and the intent to select all of the information corresponding to each other, and extracts from the selected information the information related to the intent to be provided to the user terminal in accordance with previously set priority.

According to the embodiment of the present invention, the information management device further includes a group information database storing the names of groups, user information in each group, and style information on a role model selected by group therein, and the information providing unit performs grouping for users having similar styles to each other with respect to the content of the registered intent, applies names to the respective groups, selects a role model by group, and provides the style information on the role model to the user terminal through the communication unit.

According to the embodiment of the present invention, when intents are received from other user terminals, the information providing unit searches for the group information database, selects the group related to the intents, and extracts the style information on the role model of the selected group, and provides the extracted style information to other user terminals.

According to the embodiment of the present invention, when the information related to the intent or the style information on the role model is updated, the information providing unit provides the updated information related to the intent or the updated style information to the user terminal through the communication unit.

To accomplish the above-mentioned objects of the present invention, according to a fourth aspect of the present invention, there is provided an intelligent information providing method including the steps of: requesting an information management device to register an intent for a given word through a user terminal when the given word from a content recorded on a memo pad is selected by a user; and registering the intent requested by the user terminal through the information management device, extracting the information related to the registered intent or the style information on a role model in a group related to the intent from a previously set database, and providing the extracted information to the user terminal.

To accomplish the above-mentioned objects of the present invention, according to a fifth aspect of the present invention, there is provided an intelligent information providing method to a user terminal, the method including the steps of: (a) executing an application providing a memo pad, selecting an intent designation command, and obtaining a given word selected from a content recorded on the memo pad by a user; (b) enlarging and outputting the given word and designating the enlarged word as an intent and alternatively outputting an intent recommendation list for the selected word and designating the selected word by the user in the intent recommendation list as an intent, in accordance with a previously set intent designation type; and (c) registering the designated word as the intent.

According to the embodiment of the present invention, the step of (b) includes the steps of: when the intent designation type is a recommendation input type, recognizing the selected word to acquire similar words thereto, and outputting the similar words as the intent recommendation list to a given area on the memo pad; and designating the word selected by the user in the intent recommendation list as the intent.

According to the embodiment of the present invention, the step of (b) includes the steps of: when the intent designation type is an enlargement input type, enlarging and outputting all of the words on a line in which the selected word is contained; and designating the word selected by the user from the enlarged and outputted words as the intent.

According to the embodiment of the present invention, the intelligent information providing method further includes the steps of: requesting an information management device to register the intent; and receiving the information related to the registered intent or the style information on a role model in a group related to the intent from the information management device, after the step of (b), and the information related to the intent is formed of the information converted into templates in response to the intent of the user.

To accomplish the above-mentioned objects of the present invention, according to a sixth aspect of the present invention, there is provided an intelligent information providing method from an information management device, the method including the steps of: (a) registering an intent when a registration of the intent is requested by a user terminal; and (b) extracting information related to the registered intent or style information on a role model in a group related to the intent from a previously set database and providing the extracted information to the user terminal.

According to the embodiment of the present invention, the step of (b) includes the steps of: recognizing the intent of the user in response to categories where the information related to the intent is present; searching for a previously set information map database to extract the information related to the intent; and converting the extracted information related to the intent into templates in response to the recognized intent of the user to provide the templates to the user terminal.

According to the embodiment of the present invention, wherein the step of (b) includes the steps of: performing grouping for users having similar styles to each other with respect to the content of the registered intent to apply names to the respective groups; and selecting a role model by group to provide the style information on the role model to the user terminal.

According to the embodiment of the present invention, the step of (b) further includes the steps of: searching for a previously set group information database when the intent is received from another user terminal; selecting the group related to the intent; extracting the style information on the role model of the selected group; and providing the extracted style information to the user terminal.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 8A to 8C are exemplary views showing the configuration of templates of the present invention in response to the intent of a user.

DETAILED DESCRIPTION OF THE PREFERRED EMBODIMENT

Hereinafter, an explanation on an intelligent information providing system and method according to the present invention will be in detail given with reference to the attached drawings.

Figure 1:
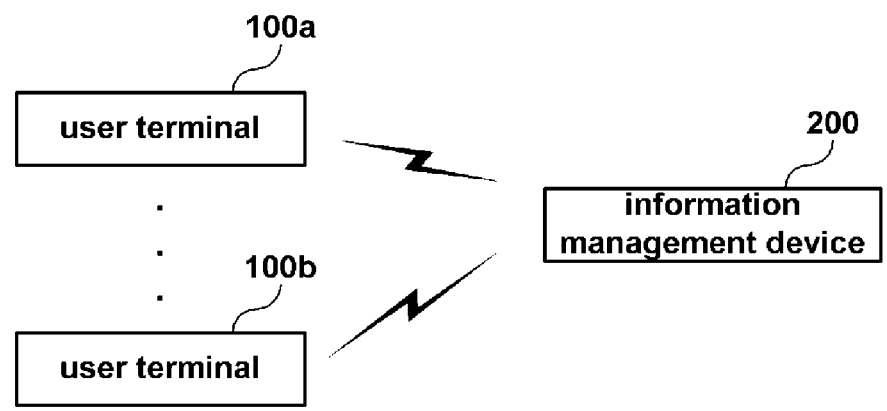
FIG. 1 is a schematic diagram showing an intelligent information providing system according to the present invention.

FIG. 1 is a schematic diagram showing an intelligent information providing system according to the present invention.

Referring to FIG. 1, the intelligent information providing system according to the present invention includes at least one user terminal 100 and an information management device 200.

The user terminal 100 requests a registration of an intent for a given word selected from the content recorded on a memo pad and receives information related to the registered intent or style information on a role model from the information management device 200.

That is, the user terminal 100 executes the application providing the memo pad, and when the given word is selected from the content recorded on the memo pad, the given word is enlarged, outputted and registered as the intent in accordance with a previously set intent designation type. Alternatively, an intent recommendation list for the selected word is outputted and thus the selected word in the intent recommendation list is registered as the intent in accordance with a previously set intent designation type.

In this case, the term "intent" means words, phrases, and sentences flashed into a user's mind, and the words, phrases, and sentences are related to a subject of information to be provided to the user, that is, an object the user wants to know, an object the user wants to purchase, a subject the user is interested in, and the like. The intents may include various expressions on a subject of information the user wants to know, for example, 'Pimagol Sonata', 'Hedwig', 'The Notebook', and 'Legally Blonde', and further, the intents may be registered to various forms such as text, image, sound source, video file, QR code and the like.

Moreover, the user terminal 100 drives the application providing a memo pad function and an intent management function and thus receives an intelligent information providing service from the application. Alternatively, the user terminal 100 executes the application providing the intent management function, retrieves the memo content from the memo pad on the application providing only the memo pad function, selects a portion of the retrieved memo content, and registers the selected content as the intent.

Further, the user terminal 100 receives information related to the registered intent or style information on a role model from the information management device 200. At this time, the information related to the registered intent may be formed of the information converted into templates in response to the intent of the user.

A detailed explanation on the user terminal 100 performing the above-mentioned functions will be given with reference to FIG. 2.

The information management device 200 registers the intent requested by the user terminal 100 and provides the information related to the registered intent or the style information on the role model for a group related to the intent to the user terminal 100.

That is, the information management device 200 analyzes the registered intent to recognize the intent of the user, searches for the information map database to periodically extract the information related to the intent, converts the extracted information related to the intent into template in response to the recognized intent of the user, and provides the converted information to the user terminal 100.

Further, the information management device 200 performs grouping for the users having similar styles to each other with respect to the content of the registered intent, applies names to the respective groups, selects a role model by group, and provides the style information of the role model to the user terminal 100.

When the registration of intent is requested from the user terminal 100, furthermore, the information management device 200 stores the intent in an intent database by user, searches for the information corresponding to the intent by using a personalized search database, applies priority to the found information by using a personalized algorithm, and thus provides the information related to the intent having high priority to the user terminal 100.

Additionally, the information management device 200 may distribute and store a general search database, an intent database or a search database to a plurality of servers, and further may distribute and proceed with data to a plurality of servers (web servers) on the basis of cloud computing technology.

A detailed explanation on the information management device 200 performing the above-mentioned functions will be given with reference to FIG. 3.

Figure 2:
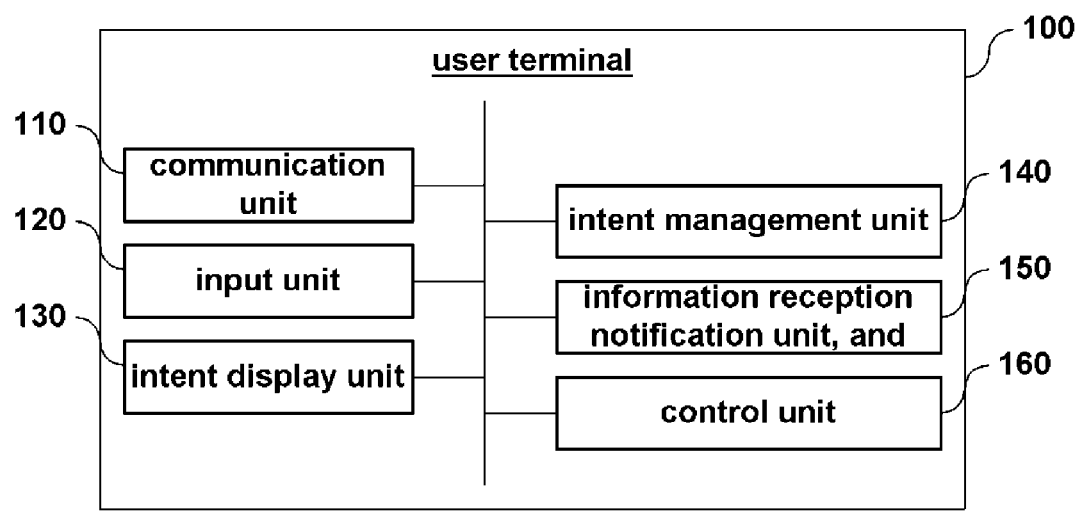
FIG. 2 is a schematic block diagram showing the configuration of a user terminal in the intelligent information providing system according to the present invention.

Referring first to FIG. 2, FIG. 2 is a schematic block diagram showing the configuration of a user terminal in the intelligent information providing system according to the present invention.

As shown, the user terminal 100 includes a communication unit 110, an input unit 120, an intent display unit 130, an intent management unit 140, an information reception notification unit 150, and a control unit 160.

The communication unit 110 transmits the intent contained in a final intent list managed in the intent management unit 140 to the information management device 200 and receives the information related to the intent contained in the final intent list or the style information on a role model from the information management device 200. At this time, the communication unit 110 may receive the information related to the intent contained in the final intent list or the style information on the role model from the information management device 200 real time as soon as the information is updated or periodically, and if the information is requested directly by the user, the communication unit 110 receives the information from the information management device 200.

The input unit 120 produces an input signal in accordance with the user's selection to transmit the produced input signal to the control unit 160. The user can input the intent through the input unit 120 and selects checking for the information related to the intent or the style information on the role model. The input unit 120 may include a keypad and a touch panel for the touch input of the user, an acceleration sensor and a vibration sensor for the operation input of the user, a voice recognizing device for the voice input of the user, and a camera for the image input of the user. Accordingly, the user inputs and registers the intent in various forms, for example, text, voice recognition, image or video file, and code information.

When the given word is selected from the memo content recorded on the memo pad, the intent management unit 140 enlarges and outputs the selected word and designates the selected word as the intent in accordance with a previously set intent designation type. Alternatively, the intent management unit 140 outputs the intent recommendation list for the selected word and designates the selected word as the intent in accordance with a previously set intent designation type, and registers the designated word as the intent.

When the intent designation type is a recommendation input type, that is, the intent management unit 140 recognizes the selected word to acquire similar words thereto, outputs the similar words as the intent recommendation list, and designates the word selected by the user in the intent recommendation list as the intent. In this case, the similar words means the words related to the corresponding word, and the related words to each word have been previously registered. The intent recommendation list may be outputted in the form of overlaying, screen division, or pop-up.

The intent management unit 140 acquires the similar words to the selected word by using a word association model for the selected word. In this case, the word association model is produced based on the number of times of the detection of key words pairs. Further, the intent management unit 140 acquires the words having high frequency appearing at the same time with the selected word as the similar words.

For example, when a word 'Pimagol' from the memo contents is selected by a user, the intent management unit 140 acquires the words "Pimagol', 'Pimagol Sonata', and 'Pimagol restaurant' related to the selected word 'Pimagol' as the similar words thereto and displays the acquired words on a given area of the memo pad as the intent recommendation list.

A method for acquiring the similar words to the recognized word through the intent management unit 140 has been suggested in the conventional art, and therefore, a detailed explanation on the method will be avoided.

When the intent designation type is an enlargement input type, on the other hand, the intent management unit 140 enlarges and outputs the selected word and designates the enlarged and outputted word as the intent. In this case, the intent management unit 140 enlarges and outputs all of the words on a line in which the selected word is contained and designates the word selected by the user in the enlarged and outputted words as the intent. Accordingly, the user can accurately designate the word to be registered as the intent from the enlarged and outputted words.

Through the above-mentioned manner, the intent management unit 140 selects a portion of the memo content recorded on the memo pad and designates the selected portion as the intent.

Further, the intent management unit 140 may retrieve the memo content from the memo pad on another application by using open API (Application Program Interface) or plug-in technology. That is, the intelligent information providing service can be provided by executing the application providing both of the memo pad function and the intent management function, and alternatively, the application providing the intent management function is executed, while the memo content on the memo pad of another application providing only the memo pad function is being retrieved, so that a portion of the retrieved memo content is selected and registered as the intent.

When the intent is registered with a plurality of words, phrases or sentences, the intent management unit 140 divides it into meaningful words through morpheme analysis, combines the divided words, and manages the combined result as the final intent list. When the intent is inputted in the form of voice recognition, image file, video file, or QR cod information, further, the intent management unit 140 converts the input into the word corresponding thereto and manages the converted result as the final intent list.

When the intent registration is requested or the intent deletion is requested through the completion of the selection of the registered intent, the intent management unit 140 requests the information management device 200 to register or delete the intent. At this time, the intent management unit 140 may request the information management device 200 to register or delete the intent by using various methods such as SMS, WAP-Push and the like.

Accordingly, the intent management unit 140 registers the subject related to the information the user wants to know as the intent or deletes the previously registered intent and thus manages the final intent list.

The intent display unit 130 displays the information related to the intent or the style information on the role model provided from the information management device 200 through the communication unit 110.

Further, the intent display unit 130 produces an intent display screen in various forms such as memo, tile, list, post-it and the like. Further, the intent display unit 130 determines fonts, font sizes, and colors for displaying the final intent list, the number of pieces of information related to the intent or the content of the information related to the intent, and the style information on the role model in accordance with the user's setting and thus produces the display screen corresponding thereto.

If the information related to the intent registered by the user is received from the communication unit 110, the information reception notification unit 150 notifies the user of the reception of the information related to the intent.

Further, the information reception notification unit 150 notifies the user of the reception of the style information on the role model of the group related to the intent registered by the user.

Moreover, the information reception notification unit 150 may be formed in the form of small icon at the top end of the display unit of the user terminal 100, text type push notification at the center of the display unit of the user terminal 100 and the like, and releases the notification function in accordance with the user's setting.

The control unit 160 controls the operations of the units, thereby periodically transmitting the final intent list obtained through the registration or deletion of the intent to the information management device 200 through the communication unit 110, periodically receiving the new information related to the intent contained in the final intent list or the style information on the role model in the group related to the intent from the information management device 200, and displaying the received information through the intent display unit 130.

Figure 3:
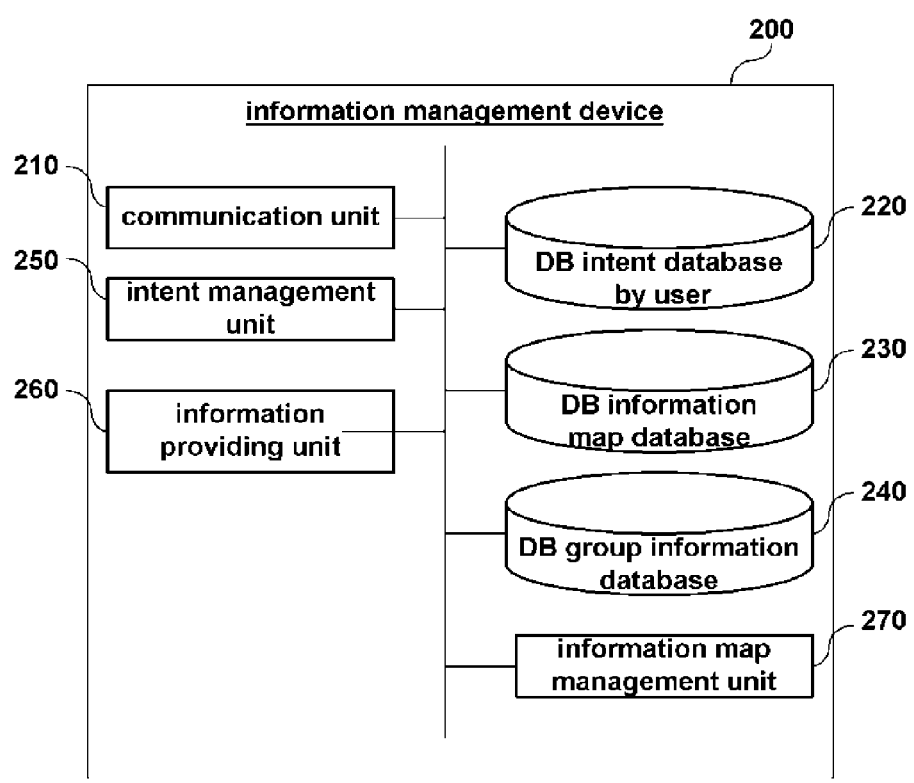
FIG. 3 is a schematic block diagram showing the configuration of an information management device in the intelligent information providing system according to the present invention.

FIG. 3 is a schematic block diagram showing the configuration of the information management device in the intelligent information providing system according to the present invention.

Referring now to FIG. 3, the information management device 200 includes a communication unit 210 communicating with the user terminal 100, an intent database by user 220, an information map database 230, a group information database 240, an intent management unit 250, an information providing unit 260, and an information map management unit 270.

The information map database 230 stores the relation between concepts by category and the information corresponding to each concept in the form of a tree. That is, the information map stored in the information map database 230 is configured wherein the relation between a super ordinate concept and a subordinate concept and the information corresponding to each concept are stored in the form of a tree, and they can be previously modeled and stored by category. For example, the information map related to shopping models clothes, goods, beauty, food, living, health, leisure, automobiles, appliances, and books as the super ordinate concept, models women clothes, men clothes, and children clothes as the subordinate concept of the clothes, and models T-shirts, blouses, and one-piece dresses as the subordinate concept of the women clothes.

The group information database 240 stores the names of groups divided in the information providing unit 260, the user information contained in the groups, and the style information on the role model selected by group therein.

When the registration or deletion of the intent is requested from the user terminal 100 through the communication unit 210, the intent management unit 250 registers or deletes the intent to or from the intent database by user 220 and thus updates the intent database by user 220.

Accordingly, if the registration of the new intent or the deletion of the registered intent is requested from the user terminal 100, the intent management unit 250 searches for the corresponding intent database 220 and thus stores or deletes the intent.

The intent management unit 250 applies identification numbers to the unit of user terminal or user and thus manages the intent database 220. Preferably, the intent management unit 250 applies identification numbers to the unit of user and manages the intents registered or deleted on and from a plurality of terminals owned by users.

The information providing unit 260 provides the information related to the intent registered by the intent management unit 250 or the style information on the role model of the group related to the intent to the user terminal 100.

The information providing unit 260 analyzes the registered intent to recognize the intent of the user, searches for the information map database 230 to periodically extract the information related to the intent, converts the extracted information related to the intent into the templates in response to the recognized intent of the user, and finally provides the templates to the user terminal. At this time, the information providing unit 260 searches for the information map database 230 to determine the categories where the information related to the intent exists and thus recognizes at least one user intent among information type intent, schedule type intent, location type intent, character type intent, and planning type intent in accordance with the determined categories. The templates have different structures in accordance with the information type intent, schedule type intent, location type intent, character type intent, and planning type intent, and each template is divided to before and after a target action is achieved.

The information type intent has categories such as goods, airline tickets, real estate, coupons, news, books, interest rates, stock prices, travel, performance, delicious restaurant, movies, CD/DVD, music and the like, and the template providing the information related to each category is constructed. That is, the information type intent finds and exhibits optimal information based on the text recognized through multi-models (for example, image capture, voice recognition, QR code recognition, copy & paste and so on) and based on the intent inputted or registered through external service, and so as to suggest the result corresponding to the subject and situation to the user, provides customized information in accordance with goods, airline tickets, real estate, coupons, news, books, interest rates, stock prices, travel, performance/exhibition, delicious restaurant, movies, CD/DVD, music and the like.

The schedule type intent is configured with the template providing calendar and information on the schedule in accordance with cases where only schedule is registered and only date is registered.

The location type intent is configured with the template providing map and information on location if the information on a specific location is registered as the intent. That is, when the location where check-in is done is registered as the intent, the location information is retrieved to display the intent on the upper end of the map, and the result of the information type intent is exhibited on the lower end thereof.

If a person name is registered as the intent, the character type intent is configured with the template providing the character information in accordance with the cases where the person is known to the user and famous to peoples. That is, when the character type intent is registered, the appropriate character information in accordance with the cases where the person is known to the user and famous to peoples is provided on the upper end of the template, and the result of the information type intent is provided on the lower end thereof.

When a given procedure such as a real estate purchasing procedure, electronic passport request and so on is registered as the intent, the planning type intent is configured with the template providing the corresponding procedure.

For example, when the intent inputted from the user is "Ban Kimoon", the information providing unit 260 searches for the information map database 230 and determines the categories having the information related to "Ban Kimoon".

If "Ban Kimoon" exists in the categories of books, news, and characters, the information providing unit 260 recognizes that the user wants to know the information on "Ban Kimoon" through the books and news and to know the character "Ban Kimoon". That is, the information providing unit 260 recognizes the intent of the user as the information type intent and the character type intent. Next, the information providing unit 260 converts the information related to "Ban Kimoon" into the information type template and the character type template and provides the converted information to the user terminal 100.

Further, the information providing unit 260 compares the information map stored in the information map database 230 with the intent, selects all of the information corresponding to each other, and extracts the related information to be provided to the user terminal 100 from the selected information in accordance with the previously set priority. In this case, the priority is determined by applying weight to the information selected by using at least one of the preference of the user, the degree related to the user, other intents inputted by the user, the use history of the user, and the style information of the user, and the information providing unit 260 further extracts the related information corresponding to the priority in the previously set order.

When the intent list containing a plurality of intents is transmitted from the user terminal 100, in addition, the information providing unit 260 extracts the information related to each intent and provides the extracted information to the user terminal 100.

Further, the information providing unit 260 extracts the information related to the intents received periodically from the user terminal 100 through the information map database 230, compares the extracted information related to the intents with the information related to the intents transmitted before this time period to the user terminal 100, extracts the new information related to the intent updated on the information map database 230, and provides the extracted information to the user terminal 100.

On the other hand, the information providing unit 260 performs grouping for the users having similar styles to each other on the basis of the contents of the registered intents, applies a name to each group, selects a role model by group, and provides the style information on the role model to the user terminal 100.

When the intents are received from the user terminal 100 through the communication unit 210, in more detail, the information providing unit 260 performs grouping for the users having similar styles to each other on the basis of the contents of the registered intents and applies a name to each group. That is, the information providing unit 260 extracts the users who register the intents having similar contents as the users having similar styles to each other, performs grouping for the extracted users as one group, and applies the name meaning the features of each group to the group.

The groups divided by the information providing unit 260 have various fields such as travel, performance, music, movie, fashion, café, delicious restaurant, finance, real estate, house wife, medical, cooking, student, entertainment, love, and the like.

For example, if the contents of the intents correspond to travel, the information providing unit 260 extracts the users who register the intents related to travel, designates the extracted users as one group, and applies a name meaning the features of the travel, for example, "Let's travel" to the group.

Further, the information providing unit 260 selects a role model by group and provides the style information on the role model to the user terminal 100 through the communication unit 210.

At this time, the information providing unit 260 selects the user selected by the users of each group as the role model of the group and provides the style information on the selected role model to the user terminal 100.

Further, the information providing unit 260 selects an opinion leader by field and thus selects the opinion leader as the role model. Alternatively, the information providing unit 260 may select the user who exhibit dynamic PA utilization and activities among general users as the role model. In this case, the opinion leader may become a famous person such as an entrepreneur, a power blogger and the like. For example, the opinion leader in the travel field may become Hana tour MD, that in performance may become Interpark MD, that in music may become Pop columnist Kim Taehoon, that in movie may become critic Lee Dongjin, that in fashion may become designer Lee Woonki, that in delicious restaurant may become a blogger pat2bach, that in cooking may become cook Big mama.

Further, the information providing unit 260 may select the user who has a large number of thanks messages received after information recommendation/sharing by field as the role model.

In this case, one role model is selected by field, but one or more role models may be selected.

The information providing unit 260 provides the style information on the selected role model to the user. In this case, the style information contains taste, preference, interests, and principal activity area of the user selected as the role model.

When the style information on the role model by group is updated, further, the information providing unit 260 transmits the updated style information to the terminals of the users in the corresponding group through the communication unit 210.

When the role model by group is changed, further, the information providing unit 260 transmits the style information on the changed role model to the terminals of the users in the corresponding group through the communication unit 210.

When the intent is received through the communication unit 210 from another user terminal, furthermore, the information providing unit 260 searches for the group information database 240, selects the group related to the intent, extracts the style information on the role model of the selected group, and provides the extracted style information to another user terminal.

Further, the information providing unit 260 searches for the information corresponding to the intent stored in the intent database 220 by using the information map database 230. At this time, when the intent stored in the intent database 220 is formed of a phrase or a sentence, the information providing unit 260 divides it into meaningful words through morpheme analysis, combines the divided words, and performs the information searching.

On the other hand, when the intent stored in the intent database 220 is formed of a sound source, image or video, the information providing unit 260 performs matching with the text corresponding thereto, combines the corresponding text and the sound source, image or video, and performs the information searching.

The information providing unit 260 applies priority to the found information related to the intent by using a personalized algorism, extracts the information related to the intent having high priority, and provides the extracted information to the user terminal 100.

Further, the information providing unit 260 produces the message on the extracted information related to the intent and transmits the produced message to the user terminal 100. In this case, the produced message may contain the URL link information of the information related to the intent, the list thereof, and a portion of data thereof.

When new information is updated on the information map, the information map management unit 270 adds the updated information to the information map and thus manages the information map.

Under the above-mentioned configuration, the information management device 200 further may include an authentication unit (not shown), and the authentication unit is connected to the user terminal 100 requesting the registration or deletion of intent and authenticates whether the user terminal is subscribed to the intelligent information providing service.

The information management device 200 collects the intents registered by the users subscribed to the intelligent information providing service, manages those through the intent database by user 220, collects the personal information of the service users, and produces the personalized search database by user. Therefore, the authentication procedure may be needed.

Figure 4:
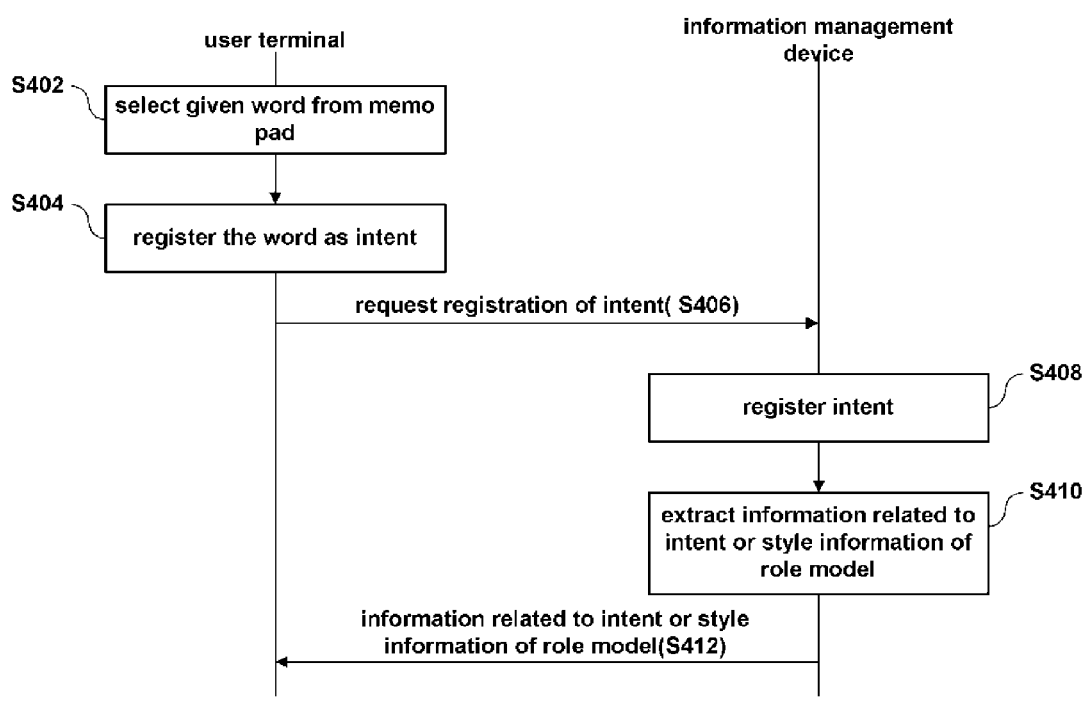
FIG. 4 is a flow chart showing an intelligent information providing method according to the present invention.

FIG. 4 is a flow chart showing an intelligent information providing method according to the present invention.

Referring to FIG. 4, the user terminal executes the application providing a memo pad by the user to allow a given word to be selected from the memo pad at step S402, and if the selected word is desired to be registered as an intent at step S404, the user terminal requests an information management device to register the intent with the selected word at step S406.

The user terminal registers or deletes the intent in accordance with a previously set intent designation type and transmits the registered or deleted intent and the intent content to the information management device. That is, the user terminal executes the application to select a portion of the stored memo content, so that the selected memo content is registered as the intent or the selection is finished to delete the selected word from the intent.

If the intent is registered or deleted as mentioned above, the user terminal transmits the registered or deleted intent and the intent content to the information management device.

A detailed explanation on the method for registering the intent through the user terminal according to the present invention will be given with reference to FIG. 4.

If step S406 is conducted, the information management device registers the intent in response to the request of the registration of the intent at step S408 and extracts the information related to the intent registered or the style information on the role model of the group related to the intent from a database at step S410. That is, when the information management device receives the registration of intent or the deletion of intent from the user terminal, it handles the registration of intent or the deletion of intent and stores the handled results in the intent database by user. The intent database by user may be managed in correspondence with the identification information ID used for the authentication procedure.

After that, the information management device transmits the extracted information related to the intent or the style information on the role model to the user terminal at step S412.

A detailed explanation on the method for extracting and providing the information related to the intent from the information management device to the user terminal will be given with reference to FIG. 7, and a detailed explanation on the method for providing the style information on the role model from the information management device to the user terminal will be given with reference to FIG. 9.

Figure 5:
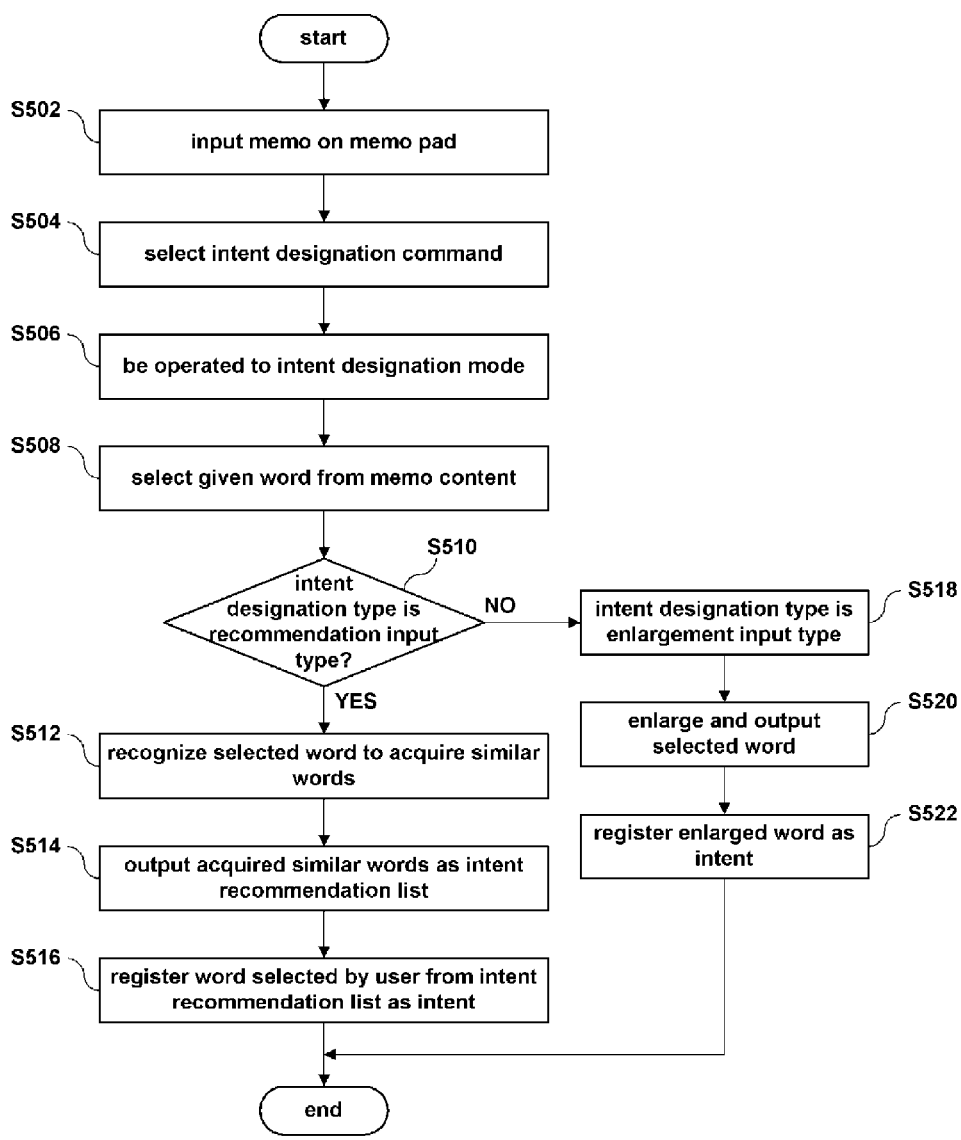
FIG. 5 is a flow chart showing a method for registering the intent through the user terminal according to the present invention.
Figure 6:
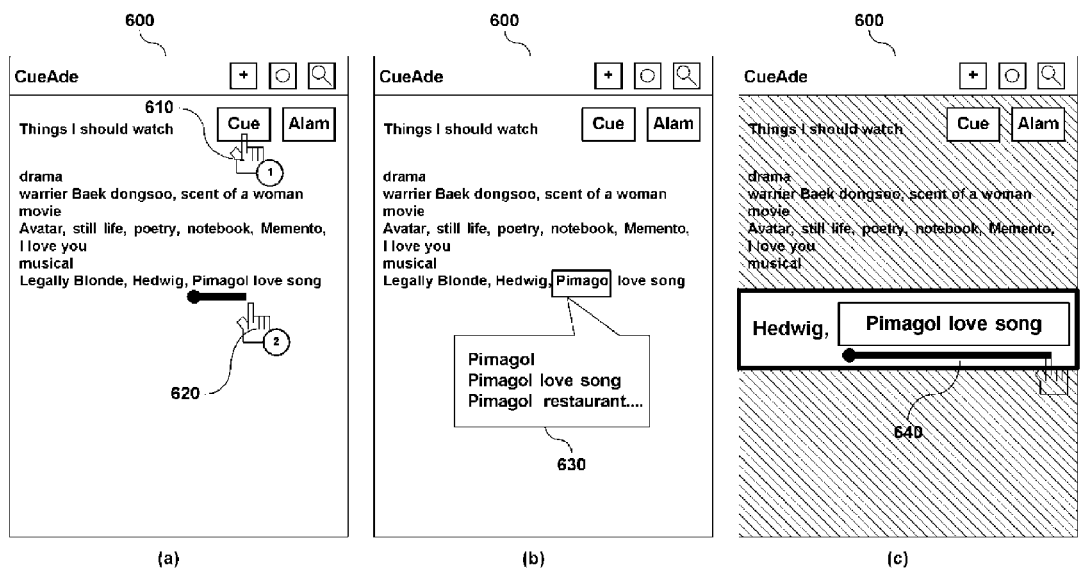
FIGS. 6A to 6C are screen exemplary views showing the intent registration method according to the present invention.

First, FIG. 5 is a flow chart showing a method for registering the intent through the user terminal according to the present invention, and FIGS. 6A to 6C are screen exemplary views showing the intent registration method according to the present invention.

Referring first to FIG. 5, a user executes the application providing the memo pad and inputs memo on the memo pad at step S502. Next, if an intent designation command is selected at step S504, the user terminal operates to an intent designation mode where the intent is designated at step S506.

After step S506, if the user selects a given word from the memo content at step S508, the user terminal determines whether a previously set intent designation type is a recommendation input type at step S510.

If it is determined that the previously set intent designation type is the recommendation input type, the user terminal recognizes the selected word and acquires the similar words thereto at step S512, and the similar words are displayed in the form of the intent recommendation list on a given area of the memo pad at step S514.

If it is determined that the previously set intent designation type is an enlargement input type, the user terminal enlarges and displays the selected word at step S520 and designates and resisters the enlarged and outputted word as the intent at step S522. In this case, the user terminal enlarges and outputs all of the words on a line in which the selected word is contained, and accordingly, the user can accurately designate the word to be registered as the intent from the enlarged and outputted words.

The method for registering the intent by the user terminal of the user will be described with reference to FIGS. 6A to 6C. Referring to FIGS. 6A to 6C, the user executes the application providing the memo pad 600 and inputs memo on the memo pad 600, as shown in FIG. 6A. Next, the user selects an intent designation command "cue selection mode 610". The memo is inputted in the form of words, phrases, sentences, images and voice, and the cue selection mode 610 is provided in the form of a pen, a logo and the like.

Next, the user selects a given word to be registered as the intent from the memo content. At this time, in the state where the previously set intent designation type is a recommendation input type, if the user selects 'Pimagol' as a word to be registered as the intent, the user terminal displays the similar words 630 to the selected word 'Pimagol', that is, 'Pimagol' 'Pimagol love song' 'Pimagol restaurant' and so on in the form of the intent recommendation list on a given area of the memo pad as shown in FIG. 6B.

In the state where the previously set intent designation type is an enlargement input type, if the user selects 'Pimagol love song' as the word to be registered as the intent, the user terminal enlarges all of the words on a line in which the selected word 'Pimagol love song' is contained and displays the enlarged line 640. In this case, the user can accurately designate the word to be registered as the intent.

Figure 7:
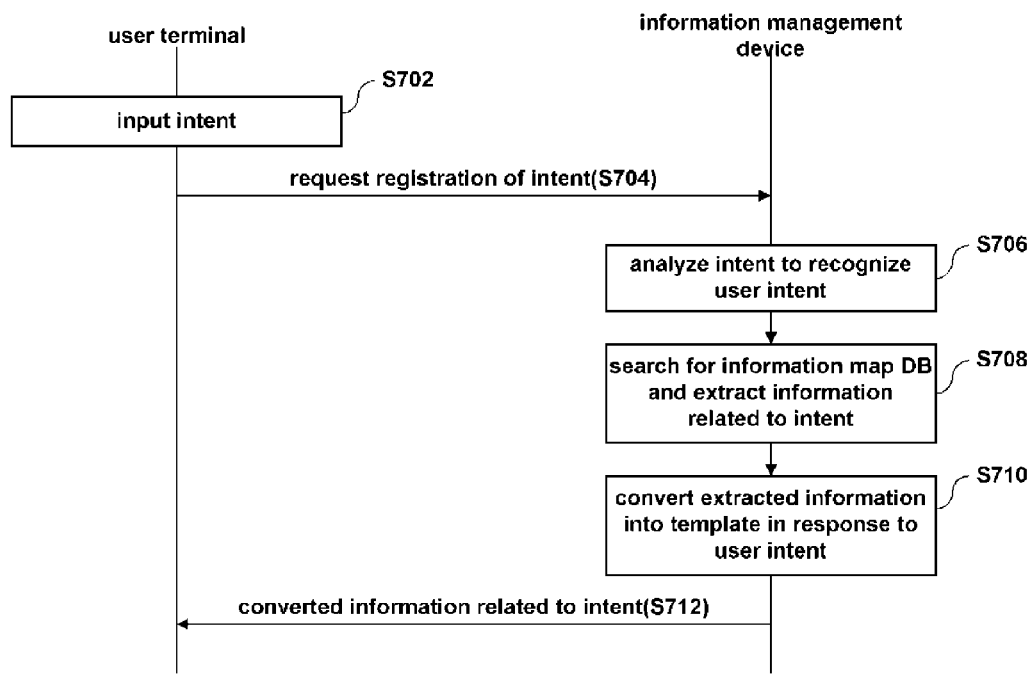
FIG. 7 is a flow chart showing an intelligent information providing method of the present invention in response to the intent of a user.

FIG. 7 is a flow chart showing an intelligent information providing method of the present invention in response to the intent of the user, and FIGS. 8A to 8C are exemplary views showing the configurations of templates of the present invention in response to the intent of the user.

Referring to FIG. 7, if the intent to be registered is inputted from the user at step S702, the user terminal transmits the intent registration request signal inclusive of the intent to the information management device at step S704. The intent registration request signal includes the intent and the user terminal identification information.

Next, the information management device analyzes the intent to recognize the intent of the user at step S706 and searches for an information map database to extract the information related to the intent at step S708. That is, the information management device analyzes the intent to recognize whether the intent of the user corresponds to information type intent, schedule type intent, location type intent, character type intent, or planning type intent.

After that, the information management device converts the extracted information related to the intent into the template in response to the recognized intent of the user at step S710 and transmits the template to the user terminal at step S712.

For example, if the intent of the user corresponds to the information type intent for a specific product, the information management device converts the extracted information related to the intent into the template as shown in FIG. 8A and transmits the template to the user terminal. Referring to FIG. 8A, brief information on product image, product name, price, place by price, and so on is displayed on the thumbnail of the top end portion of the template, and detailed information on the brief information displayed on the thumbnail is provided on the detailed page of the bottom end thereof.

For example, if the intent of the user is the location type intent for a specific location, the information management device converts the extracted information related to the intent into the template as shown in FIG. 8B and transmits the template to the user terminal. Referring to FIG. 8B, the corresponding location to the map is displayed on the top end portion of the template, and the information type intent corresponding to the location is provided on the bottom end thereof.

For example, if the intent of the user corresponds to the character type intent for a specific character, the information management device converts the extracted information related to the intent into the template as shown in FIG. 8C and transmits the template to the user terminal.

Figure 9:
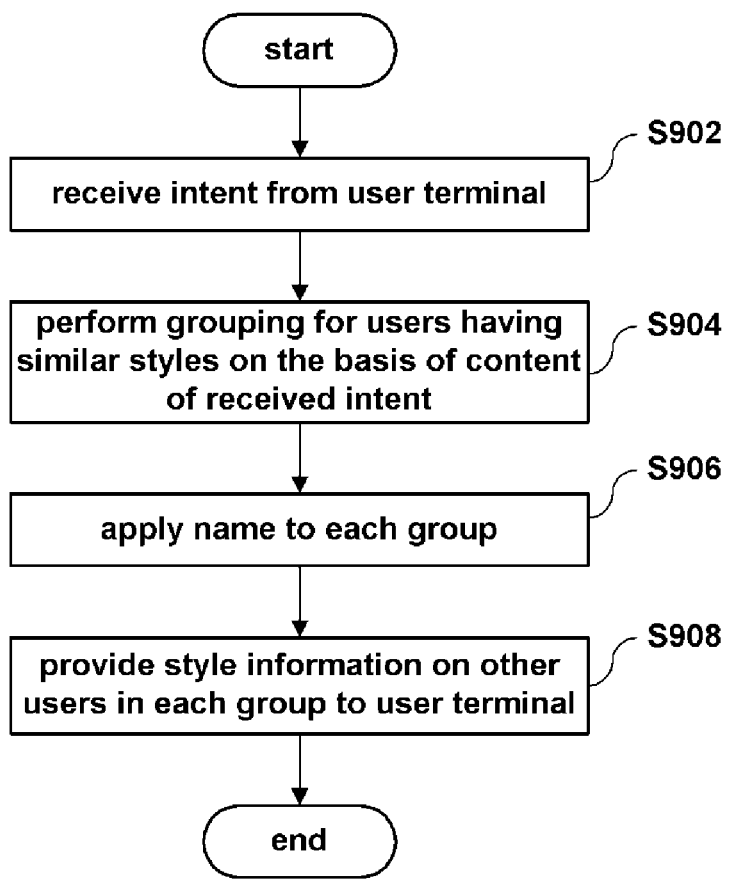
FIG. 9 is a flow chart showing the intelligent information providing method through an information management device according to the present invention.

FIG. 9 is a flow chart showing a method for providing intelligent information through an information management device according to the present invention.

Referring to FIG. 9, if the intent is received from the user terminal at step S902, the information management device performs the grouping for the users having similar styles to each other with respect to the content of the registered intent at step S904 and applies names to the respective groups at step S906. That is, the information management device extracts the users who register the intents having similar contents to the intent as the users having similar styles, performs grouping for the extracted users as one group, and applies the name meaning the features of each group to the group.

After that, the information management device selects a role model by group and provides the style information on the role model to the user terminal at step S908.

Accordingly, the user of the user terminal receives the style information on another user in the same group, for example, on the role model and thus establishes his or her own style. In this case, the style information contains the taste, preference, interests, and principal activity area of the user selected as the role model.

After that, when the intent is received from another user terminal, the information management device searches for the group information database and selects the group related to the intent. Next, the information management device extracts the style information on the role model of the selected group and provides the extracted style information to another user terminal.

The method for providing the intelligent information to the user terminal as mentioned above is programmable, and the codes and code segments constituting the program are easily extracted by programmers in the art.

Further, the program on the method for providing the intelligent information to the user terminal is stored in readable media capable of being read by an electronic device, so that as the readable media are read and executed through the electronic device, the intelligent information on the intent registered by the user can be provided to the user terminal.

The method for providing the intelligent information from the information management device as mentioned above is programmable, and the codes and code segments constituting the program are easily extracted by programmers in the art.

Further, the program on the method for providing the intelligent information from the information management device is stored in readable media capable of being read by electronic devices, so that as the readable media are read and executed through the electronic device, the intelligent information the user wants to obtain can be extracted and provided from the information management device.

The present invention is applicable to the intelligent information providing system and method that select the word to be registered as the intent from the content recorded on the memo pad and register the selected word as the intent.

Further, the present invention is applicable to the intelligent information providing system and method that perform the grouping for the users having similar styles to each other with respect to the content of the registered intent, apply names to the respective groups, and provide the style information on another users contained in the same group as the user to allow the user to establish his or her own style.

Furthermore, the present invention is applicable to the intelligent information providing system and method that analyze the registered intent to recognize the intent of the user and provide the information related to the intent in the form of optimal template in response to the intent of the user.

As set forth in the foregoing, there is provided the intelligent information providing system and method wherein the user can directly register the content recorded on the memo pad freely used by the user as the intent, which makes it easy to register the intent, and the search for the registered intent is executed asynchronously to store the found result or the updated found result, thus being checkable upon the user's request, whereby the system and method can be functioned as an assistant to memory of the user.

Additionally, if the given word is selected from the memo content recorded on the memo pad, the selected word is enlarged and outputted in accordance with the previously set designation type and registered as the intent. Alternatively, the intent recommendation list for the selected word is displayed in accordance with the previously set designation type and the word selected by the user is registered as the intent, thereby making the registration of the intent easy.

Further, the result adequate to the intent inputted by the user is re-processed to the form of the optimal template in response to the intent of the user.

Furthermore, the information related to the intent registered directly by the user is provided and stored, thereby effectively providing the information on the subject the user wants to know and obtain.

Also, the information is provided with the format on which a large amount of information can be effectively obtained for a short time, thereby being more advantageous in providing information in mobile environments, and the format is composed of thumbnail and detailed page, thereby being convenient in transmitting the information related to the intent.

Moreover, the grouping for the users having similar styles to each other with respect to the content of the registered intent is performed to apply the names corresponding to the features of the groups to the respective groups, and further, the style information on another users contained in the same group as the user is provided to allow the user to establish his or her own style.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An intelligent information providing system, comprising:
   a user terminal requesting a registration of an intent for a word selected from a content recorded on a memo pad and receiving information related to the registered intent or style information on a role model in a group related to the intent; and
   an information management device registering the intent requested by the user terminal and providing the information related to the registered intent or the style information on the role model in the group related to the intent to the user terminal,
   wherein when the given word is selected from the content recorded on the memo pad, the user terminal enlarges and outputs the selected word and registers the enlarged word as the intent and alternatively outputs an intent recommendation list for the selected word and registers the word selected in the intent recommendation list by a user as the intent, in accordance with a previously set intent designation type.

2. The intelligent information providing system according to claim 1, wherein the information management device analyzes the registered intent to recognize the intent of the user, searches for an information map database to extract the information related to the intent, converts the extracted information related to the intent into a template in response to the recognized intent of the user, and provides the template to the user terminal.

3. The intelligent information providing system according to claim 1, wherein the information management device performs grouping for users having similar styles to each other with respect to the content of the registered intent, applies names to the respective groups, selects a role model by group, and provides the style information on the role model to the user terminal.

4. A user terminal comprising:
   a communication unit communicating with an information management device;
   an intent management unit enlarging and outputting a given word when the given word is selected from a content recorded on a memo pad by a user and registering the enlarged word as an intent and alternatively outputting an intent recommendation list for the selected word and registering the word selected in the intent recommendation list by the user as an intent, in accordance with a previously set intent designation type;
   an intent display unit displaying the information related to the intent or the style information on a role model provided from the information management device through the communication unit; and
   a control unit controlling the operations of the units so that a final intent list obtained through the registration or deletion of the intent is periodically transmitted to the information management device through the communication unit, and new information related to the intent contained in the final intent list or the style information on the role model is periodically received from the information management device and displayed through the intent display unit.

5. The user terminal according to claim 4, further comprising an information reception notification unit notifying the user of the reception of new intent-related information when the new information related to the intent contained in the final intent list or the style information on the role model in the group related to the intent is received through the communicating unit.

6. The user terminal according to claim 4, wherein when the intent designation type is a recommendation input type, the intent management unit recognizes the selected word to acquire similar words thereto, outputs the similar words as the intent recommendation list, and designates the word selected by the user in the intent recommendation list as the intent.

7. The user terminal according to claim 4, wherein when the intent designation type is an enlargement input type, the intent management unit enlarges and outputs all of the words on a line in which the selected word is contained and designates the word selected by the user in the enlarged and outputted words as the intent.

8. The user terminal according to claim 4, wherein the information related to the intent is formed of the information converted into templates in response to the intent of the user.

9. An information management device comprising:
   a communication unit communicating with a user terminal;
   an intent management unit registering an intent when a registration of the intent is requested from the user terminal through the communication unit;
   an information providing unit providing information related to the registered intent or style information on a role model in a group related to the intent to the user terminal; and
   an information map database storing the relation between concepts by category and the information corresponding to each concept in the form of a tree,
   wherein the information providing unit recognizes the intent of the user in response to categories where the information related to the intent is present, searches for the information map database to extract the information related to the intent, converts the extracted information related to the intent into templates in response to the recognized intent of the user, and provides the templates to the user terminal through the communication unit.

10. The information management device according to claim 9, wherein the information providing unit searches for the information map database to determine the categories where the information related to the intent is present and recognizes at least one user intent among information type intent, schedule type intent, location type intent, character type intent, and planning type intent in accordance with the determined categories.

11. The information management device according to claim 9, wherein the templates have different structures in accordance with the information type intent, schedule type intent, location type intent, character type intent, and planning type intent, and each template is divided to before and after a target action is achieved.

12. The information management device according to claim 9, wherein the information providing unit compares the information map database and the intent to select all of the information corresponding to each other, and extracts from the selected information the information related to the intent to be provided to the user terminal in accordance with previously set priority.

13. The information management device according to claim 9, further comprising a group information database storing the names of groups, user information in each group, and style information on a role model selected by group therein, and wherein the information providing unit performs grouping for users having similar styles to each other with respect to the content of the registered intent, applies names to the respective groups, selects a role model by group, and provides the style information on the role model to the user terminal through the communication unit.

14. The information management device according to claim 13, wherein when intents are received from other user terminals, the information providing unit searches for the group information database, selects the group related to the intents, and extracts the style information on the role model of the selected group, and provides the extracted style information to other user terminals.

15. The information management device according to claim 9, wherein when the information related to the intent or the style information on the role model is updated, the information providing unit provides the updated information related to the intent or the updated style information to the user terminal through the communication unit.

16. An intelligent information providing method comprising the steps of:
requesting an information management device to register an intent for a given word through a user terminal when the given word from a content recorded on a memo pad is selected by a user; and
registering the intent requested by the user terminal through the information management device, extracting the information related to the registered intent or the style information on a role model in a group related to the intent from a previously set database, and providing the extracted information to the user terminal,
wherein when the given word is selected from the content recorded on the memo pad, the user terminal enlarges and outputs the selected word and registers the enlarged word as the intent and alternatively outputs an intent recommendation list for the selected word and registers the word selected in the intent recommendation list by a user as the intent, in accordance with a previously set intent designation type.

17. An intelligent information providing method to a user terminal, the method comprising the steps of:
(a) executing an application providing a memo pad, selecting an intent designation command, and obtaining a given word selected from a content recorded on the memo pad by a user;
(b) enlarging and outputting the given word and designating the enlarged word as an intent and alternatively outputting an intent recommendation list for the selected word and designating the selected word by the user in the intent recommendation list as an intent, in accordance with a previously set intent designation type; and
(c) registering the designated word as the intent,
wherein the step of (b) comprises the steps of,
when the intent designation type is a recommendation input type, recognizing the selected word to acquire similar words thereto, and outputting the similar words as the intent recommendation list to a given area on the memo pad, and
designating the word selected by the user in the intent recommendation list as the intent.

18. The intelligent information providing method according to claim 17, wherein the step of (b) comprises the steps of:
when the intent designation type is an enlargement input type, enlarging and outputting all of the words on a line in which the selected word is contained; and
designating the word selected by the user in the enlarged and outputted words as the intent.

19. The intelligent information providing method according to claim 17, further comprising the steps of:
requesting an information management device to register the intent; and
receiving the information related to the registered intent or the style information on a role model in a group related to the intent from the information management device, after the step of (b), and wherein the information related to the intent is formed of the information converted into templates in response to the intent of the user.

20. An intelligent information providing method from an information management device, the method comprising the steps of:
(a) registering an intent when a registration of the intent is requested by a user terminal; and
(b) extracting information related to the registered intent or style information on a role model in a group related to the intent from a previously set database and providing the extracted information to the user terminal,
wherein the step of (b) comprises the steps of,
recognizing the intent of a user in response to categories where the information related to the intent is present, searching for a previously set information map database to extract the information related to the intent; and
converting the extracted information related to the intent into templates in response to the recognized intent of the user to provide the templates to the user terminal.

21. The intelligent information providing method according to claim 20, wherein the step of (b) comprises the steps of:
performing grouping for users having similar styles to each other with respect to the content of the registered intent to apply names to the respective groups; and
selecting a role model by group to provide the style information on the role model to the user terminal.

22. The intelligent information providing method according to claim 21, wherein the step of (b) further comprises the steps of:
searching for a previously set group information database when the intent is received from another user terminal;

selecting the group related to the intent;
extracting the style information on the role model of the selected group; and
providing the extracted style information to the user terminal.

* * * * *